Nov. 14, 1933.                C. S. BRAGG ET AL                1,935,388
                              BRAKE MECHANISM
                           Filed Feb. 1, 1929        2 Sheets-Sheet 1
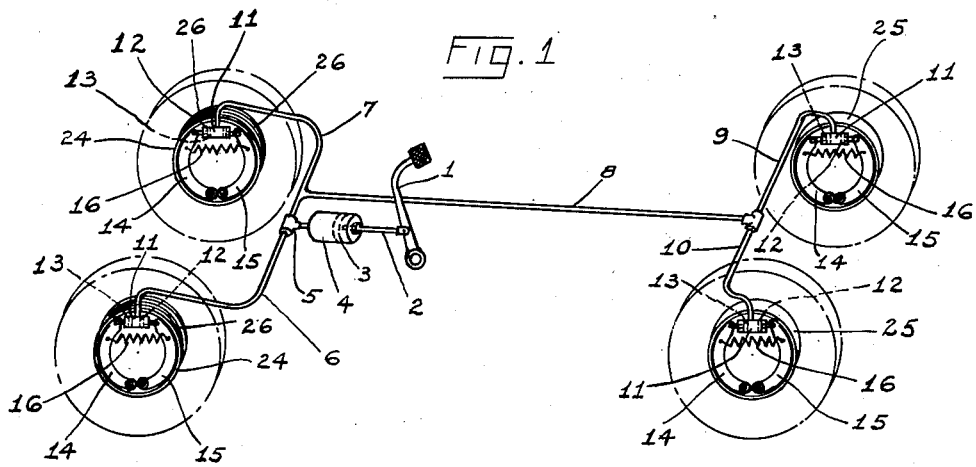
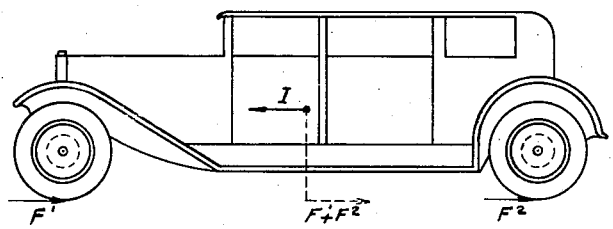
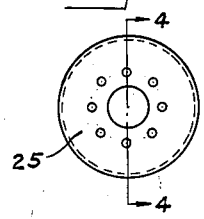 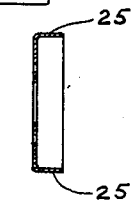 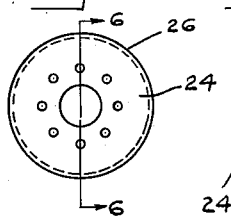
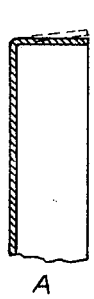 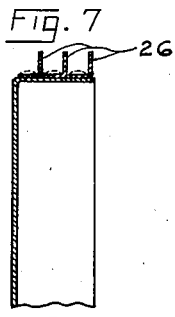 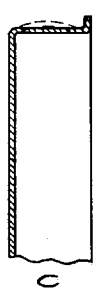
INVENTORS
BY CALEB S. BRAGG
AND
VICTOR W. KLIESRATH
John F. Ryan ATTORNEY Nov. 14, 1933.  C. S. BRAGG ET AL  1,935,388
BRAKE MECHANISM
Filed Feb. 1, 1929   2 Sheets-Sheet 2
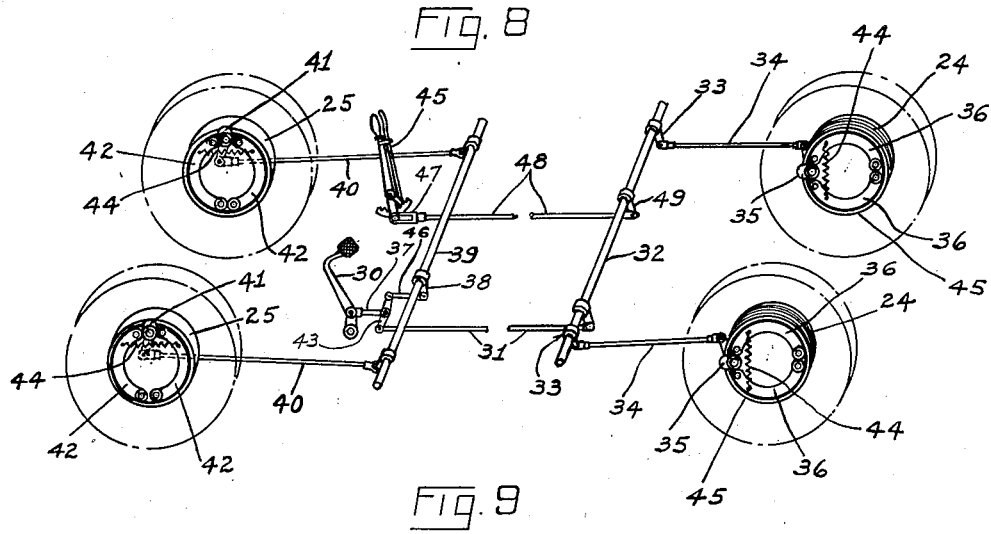
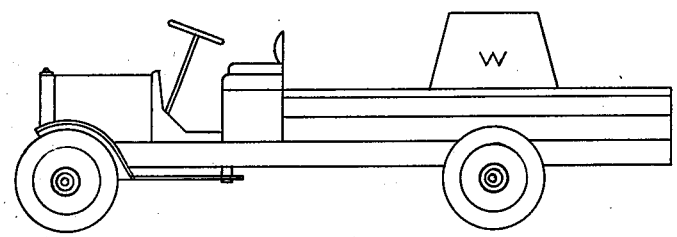
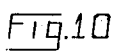
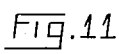
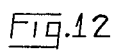
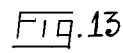
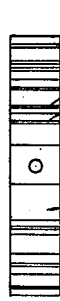
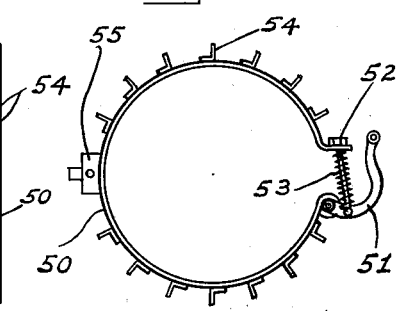
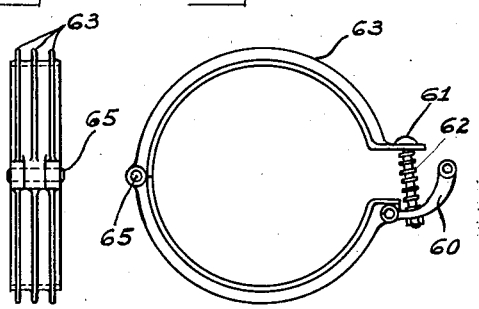
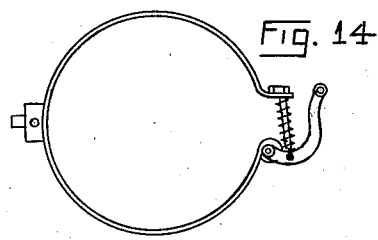
INVENTORS
CALEB S. BRAGG.
AND
BY VICTOR W. KLIESRATH.
John F. Ryan
ATTORNEY Patented Nov. 14, 1933

1,935,388

UNITED STATES PATENT OFFICE 1,935,388

BRAKE MECHANISM

Caleb S. Bragg, Palm Beach, Fla., and Victor W. Kliesrath, Port Washington, N. Y., assignors to Bragg-Kliesrath Corporation, Long Island City, N. Y., a corporation of New York Application February 1, 1929. Serial No. 336,720

4 Claims. (Cl. 188—10)

This invention relates to vehicle brake mechanism, and more particularly to such mechanism for use with automotive vehicles.

Aside from wind resistance, the only external force acting on a moving vehicle, such as an automobile, is the reaction between the tires of the vehicle and the roadway over which it is travelling and this force acts at the point of contact of the tires and roadway. When it is desired to slow down a moving automobile a force must be exerted at this point of contact in a direction opposite to the direction of motion of the vehicle. This force is usually called the force of friction, it is limited by the characteristics and condition of the roadway and tires, and is proportional to the force pressing the tires onto the roadway or in other words the load on the wheels.

A loaded rotating tire presses into the interstices and irregularities of the road surface and we might say "gears" itself to the road, whereas, a sliding tire (due to a "locked" wheel) slides over the roadway with a smaller adhesive effect. It follows that with a given load the maximum force of friction between the tires and the roadway exists, during continuous and progressive application of the brakes, just before the rotating wheels are "locked" or "skidded" and that there is a decrease in the force of friction as soon as the wheels are so locked. There are other reasons why it is undesirable to lock or skid the wheels. It causes undue wear on the tires, it interferes with the steering of the vehicle when it occurs to the front wheels, and it causes "skidding" or sluing of the vehicle from its course when it occurs to the rear wheels.

In order to produce the maximum braking effect this maximum force of friction which is produced just before the wheels "lock" and slide should be fully utilized. But, care must be exercised to prevent the brakes from "locking" the wheels with the undesirable results enumerated above.

This force of friction is directly proportional to the force pressing the tires into contact with the roadway. When the automobile is stationary this force is equal to the total weight of the car and occupants and in a pleasure car with four or five passengers is approximately equally distributed between front and rear axles.

When the brakes are applied to a moving automobile the result is that two forces act upon the vehicle. One, a force tending to keep the car moving with constant velocity in a straight line and acting in the direction of motion of the car through the center of gravity thereof (usually about eighteen inches above the ground) due to the inertia of the moving mass. Two, the force of friction acting through the points of contact of the tires with the roadway and in a direction opposite to the direction of motion of the car. These two forces acting simultaneously form a couple which tends to lift the weight of the car from the rear wheels and presses down on the front wheels. We shall call this phenomenon transfer of weight. Its result is to increase the load on the front tires and decrease the load on the rear tires and thus increase the available friction between the front tires and roadway and decrease the available friction between the rear tires and roadway.

In order that the full effect of the force of friction between the road and tires may be availed of it is desirable to compensate for this transfer of weight from the rear to the front by increasing the effective work of the front brakes and decreasing the effective work of the rear brakes simultaneously with and in proportion to the change in pressures upon the front and rear wheels respectively.

This phenomenon which we have chosen to call transfer of weight is especially noticeable on short wheel base cars and at high speeds when of course the braking effect should be most efficient to produce a quick stop. The better practice on the part of automobile manufacturers is to size the brake parts so as to exert a braking effect on the rear and on the front wheels proportional to the normal load carried by each set of wheels. This distribution of brake effort is chosen to lessen the chance of locking the wheels at either end of the vehicle before the wheels at the other end have been braked with maximum efficiency. Any other distribution of braking forces will cause the wheels at one end to lock on slippery pavements, when danger of skidding is greatest because of the decreased co-efficient of friction between the tires and the roadway.

When a vehicle is in motion it has stored within itself a certain amount of energy, due to its motion. This is usually called kinetic energy and is equal to the amount of work required to put the vehicle in motion (neglecting friction losses). This energy is proportional to the mass or weight of the vehicle and the square of its velocity. In other words an automobile travelling at sixty miles per hour has four times as much energy of motion stored up within it as the same automobile travelling at thirty miles per hour and nine times as much as the same automobile travelling at only twenty miles per hour.

The brakes on a vehicle must convert all this kinetic energy into heat energy in order to bring the vehicle to rest. Therefore when a car travelling at sixty miles per hour is brought to rest the brakes will generate nine times as much heat as when the same car is brought to rest from twenty miles per hour in the same distance because the energy whether kinetic or heat varies as the square of the velocity.

The usual automobile brake consists of a cylindrical brake drum, which should be made as light as possible to reduce the unsprung weight of the vehicle, adapted to be attached to the spokes or hub portion of the wheel to rotate therewith, and a non-rotating member supported by the axle and adapted to frictionally engage the drum. This non-rotating member is usually lined on the friction side with a fibre material (asbestos) and may be placed around the drum in the form of a band adapted to be contracted so as to engage the drum or it may be placed inside the drum and adapted to be forced outwardly into contact with the drum. The former type is known as an external or contracting brake and the latter type as an internal or expanding brake.

The heat generated by the frictional engagement of the complemental friction elements of the brake has a twofold effect upon these brake elements. First, it heats up the fibre brake lining and thus decreases its holding effect because this lining has a lower co-efficient of friction when hot than when cold. Second, it heats up the brake drum so that they expand and in so doing distort and thus decrease the effective area of contact between the drum and the fibre lining of the brake shoe or brake band.

It is an object of this invention to dissipate the heat more rapidly from the brakes at one end of the vehicle than from the brakes at the other end so as to vary the efficiency of the brakes at either end of the vehicle and thus compensate for changes in load on the front and rear axles of the vehicle due to transfer of weight or material variations in load carried by the vehicle.

How the foregoing together with such other objects and advantages as may hereinafter appear or are incident to my invention are realized, is illustrated in preferred form in the accompanying drawings, wherein:

Fig. 1 is a diagrammatic representation in perspective of an automobile brake system wherein the brakes are adapted to be applied to both front and rear wheels through a common fluid pressure means.

Fig. 2 is a side view of an automobile of the type known as a pleasure vehicle.

Fig. 3 is a side elevation of a brake drum such as those to be used on the end of the vehicle requiring a relative reduction in braking effort as the rear brake mechanism of a pleasure car or the front brake mechanism of a truck.

Fig. 4 is a section taken through line 4—4 of Fig. 3.

Fig. 5 is a side elevation of a brake drum to be used on the end of a vehicle requiring relatively increased braking effect as the front brakes of a pleasure car or the rear brakes of a motor truck.

Fig. 6 is a section taken through line 6—6 of Fig. 5.

Fig. 7A shows a section through a brake drum such as that shown in Figs. 3 and 4, and in dotted lines shows its distortion when heated.

Fig. 7B shows a section through a brake drum such as that shown in Figs. 5 and 6, and in dotted lines shows its distortion when heated.

Fig. 7C shows a section through a brake drum equipped with an outer reinforcing lip, and in dotted lines shows its distortion when heated.

Fig. 8 is a diagrammatic representation of a mechanical brake mechanism shown on a commercial automobile or motor truck and provided with an equalizer for maintaining predetermined braking forces at the ends of the brake cam levers.

Fig. 9 is a side view of a commercial automobile or motor truck.

Fig. 10 is an end view of an external brake band equipped with radiating ribs.

Fig. 11 is a side view of the brake band shown in Fig. 10.

Fig. 12 is an end view of a hinged external contracting brake shoe equipped with radiating flanges.

Fig. 13 is a side view of the brake shoe of Fig. 12.

Fig. 14 is a figure illustrating an external contracting brake equipped without radiating flanges or ribs.

Referring to the drawings and especially to Figs. 1 and 8 it will be seen that Fig. 1 illustrates a type of fluid pressure brake actuating mechanism known as hydraulic brake mechanism and that Fig. 8 illustrates that type of brake mechanism known as a mechanical linkage brake mechanism. The former produces an equal pressure in all parts of the piping and cylinders and is therefore self-equalizing while the latter is equipped with an equalizing means for maintaining pre-determined tension on the front and rear wheel brake linkage. This invention does not reside in the means for operating the brake shoes so we do not wish to be limited to any particular brake shoe operating means and have illustrated those shown in Figs. 1 and 8 merely because they are well known in the art. It is contemplated that our invention may be used in conjunction with either physically operated brake mechanism or power operated brake mechanism, both of which are well known in the art.

Looking at Fig. 1, 1 represents a brake pedal to be operated by the operator of the vehicle so as to actuate brakes on all wheels of the vehicle and connect it by link, 2, to a piston, 3, (shown in dotted lines having a sealing sliding fit in cylinder, 4). Pipes 5, 6, 7, 8, 9 and 10 lead from cylinder, 4, to four cylinders, 11, mounted near each of the four wheels of the vehicle and in operative relationship to the brake shoes. Pivotally mounted upon the axles of the vehicle adjacent to each wheel are a pair of brake shoes, 14 and 15. Within each of the cylinders, 11, are a pair of opposed pistons, 12 and 13, connected by suitable piston rods to the free ends of brake shoes, 14 and 15, so that when said pistons are forced apart they in turn move the free ends of the brake shoes apart and thus into contact with the rotating complemental friction member. A retracting spring, 16, draws the shoes and pistons, 3, 12 and 13, back into normal or off position when the operator releases pedal, 1. Any liquid may be used to transmit the force exerted by the operator from piston, 3, through the connecting device to the pistons, 12 and 13, but in practice, oil is usually used for this purpose. It is obvious that in a hydraulic system of this kind, equal fluid pressure exists in cylinders, 3 and 11.

Each of the four wheels is equipped with a brake drum as shown at 25, 25, and 24, 24, concentrically attached to the inside of the wheels so as to rotate therewith. These drums are made up of a disc like portion containing suitable bolt holes for attaching it to the hub or spokes of the wheels on the inside thereof and a cylindrical portion offset at substantially right angles from the circumferential edge of the disc like portion. The drums are made in one piece and generally of rather thin steel, to be as light as possible and not increase the unsprung weight of the wheels. The cylinder portion is adapted to be frictionally engaged by the brake shoes. When the shoes contact with the inside of this portion the brake is called an internal or expanding brake and when the shoes contact with the outside of this portion the brake is called an external or contracting brake.

In the embodiment of our invention illustrated in Fig. 1, the rear wheel brake drums, 25, and the front wheel brake drums, 24, are shown in combination with an internal expanding type of brake. Drums, 25, have a cylindrical portion of uniform thickness throughout as illustrated in Figs. 3 and 4, or may have a lip as shown in Fig. 7C. Drums, 24, have a cylindrical portion equipped with radiating and reinforcing ribs, 26, upon the exterior thereof as shown in Figs. 5 and 6. These ribs may be cast or forged as one piece with the drum during the manufacture of the same or they may consist of separate rings pressed, shrunk or otherwise attached to the outside of the friction portion of the brake drum. In Figs. 5, 6 and 7B we have illustrated a drum equipped with separate rings of right angular cross sectional configuration which may be pressed or shrunk onto the brake drum.

Referring now to Fig. 8 we have illustrated diagrammatically a mechanical brake mechanism with an equalizing means between the front and rear wheel brake mechanisms and in this instance adapted to be applied to a motor truck. We have seen fit to show and describe that type of brake shoe operating means known as a mechanical linkage system wherein the brake pedal is connected to the brake shoe operating means by a series of links, cross shafts and pivoted arms. This type of brake mechanism forms no part of the present invention and we do not limit ourselves to it but describe it briefly in order to more clearly explain the scope of our present invention.

A brake pedal, 30, adapted to operate brakes on all wheels of the vehicle is pivoted to a stationary part thereof and positioned to be conveniently actuated by the operator. It is connected by a link, 37, to the mid-point of equalizer bar, 43. One end of the equalizer bar, 43, is connected by link, 31, to the rear wheel brake operating shaft, 32, which is adapted to rotate in suitable bearings mounted on the frame. Arms, 33, on shaft, 32, connect said shaft to links, 34, which in turn are connected to the usual operating mechanism for brake shoe cams, 35, which are adapted to force apart the free ends of the brake shoes, 36, and thus force the brake shoes into contact with the brake drums.

Through link, 46, the other end of equalizer bar, 43, is connected to arm, 38, mounted on cross shaft, 39, which is adapted to rotate in suitable bearings attached to the frame members. The motion of the shaft, 39, is communicated to the front brake shoe operating cams, 41, by link, 40, in a manner well known to the art. As on the rear wheel brake cams, 41, are adapted to force apart the free ends of brake shoes, 42, so as to bring the brake shoes into frictional engagement with the brake drums. Each pair of brake shoes is equipped with the usual retracting spring, 44, to draw the shoes away from the drum upon release of the brake pedal. An extra retracting spring (not shown) may be attached to the brake operating pedal in order to return it to its at rest position.

The usual emergency brake or parking brake lever is illustrated at 45 and it is connected to brake operating cross shaft, 32, by means of link, 48, with slotted connection, 47, and pivoted arm, 49.

For reasons to be explained hereafter we equip the rear wheels of the motor truck illustrated in Fig. 9 with ribbed brake drums, 24, (Figs. 5, 6 and 7B) which have already been described in detail and we equip the front wheels with plain brake drums, 25, (Figs. 3, 4 and 7A) which have also been described.

In Figs. 10, 11, 12 and 13 we have illustrated different types of radiating friction elements adapted for external brakes.

External contracting brake shoes are of two types. One, a flexible band adapted to wrap around the outside of the brake drum and to be contracted into frictional engagement therewith by suitable linkage. This type is illustrated in Figs. 10 and 11 where 50 represents a flexible steel strap or band movably supported at 55 in the usual manner to allow a small movement toward and away from the drum as the brake is applied and then released. The band actuating means may comprise an arm, 51, pivoted to one end of the band and a bolt, 52, pivoted to the other end and to arm, 51. A retracting spring, 53, may be used to release the band upon release of the brake linkage. In this type of brake it is essential that the band maintain its flexibility so we have secured our radiating ribs, 54, transversely of the circumferential dimension of the band. When so placed they do not interfere with the flexibility of the band. These ribs may be attached by riveting or in any other manner which will produce a close union between the rib and band.

In Figs. 12 and 13 we have illustrated another type of external contracting brake wherein the contracting member is made of two semi-circular shoes pivoted at one end and connected to suitable actuating linkage at the other such as arm, 60, bolt, 61 and spring, 62, which is adapted to contract the brake shoes around a rotatable drum in a manner well known to the art. These shoes are usually cast or forged into the desired shape and have substantially no inherent flexibility but depend upon their pivoted co-ordination to contract and expand sufficiently to arrest and release the brake drum. Radiating ribs may be attached to these brake shoe members along circumferential lines as illustrated at 63, Figs. 12 and 13. These ribs may be cast or forged with the brake shoe during its manufacture or may be attached thereto by riveting or other suitable means.

In Fig. 14 we have illustrated an external or contracting band brake which is well known to the art and is similar to that shown in Figs. 10 and 11 and described above except that it is not equipped with radiating or reinforcing ribs, 54. In the use of external brakes this brake would be used on the wheels which are subject to a decrease of the normal load or a decrease of the normal load relative to the total load due in the first instance to transfer of weight as in a pleasure vehicle and in the second instance to the addition of a heavy weight as the addition of a load on a motor truck. According to our invention, if a pleasure car is equipped with external brakes on the rear wheels they should be of the plain or non-radiating type as shown in Fig. 14. Of course it is understood that they may be combined with either internal or external radiating type brakes on the front wheels and if a truck is equipped with external brakes on the front wheels they should be of this nonradiating type and may likewise be used in combination with internal or external radiating brakes for the rear wheels.

Considering first the application of our invention to a pleasure car its operation is as follows:

When the car is travelling at a high speed and the brakes are applied the force of friction represented as $F^1$ and $F^2$ (see Fig. 2) will act in the direction shown by the arrows at the point of contact of the tires and the ground. The inertia of the car will create a force acting through the center of gravity as indicated by the arrow marked I. These forces will create a couple (illustrated in dash lines Fig. 2) tending to increase the weight on the front wheels and decrease the weight on the rear wheels. Therefore, it is desirable to increase the braking effect of the front wheels and decrease the braking effect of the rear wheels an amount proportional to the change in load on the front and rear axles. We accomplish this by equipping the front wheel brake mechanism with radiating means as the cylindrical portion of the front wheel brake drums with radiating ribs as shown in Figs. 5, 6 and 7B while the rear wheel drums are not so equipped with radiating means as shown in Figs. 3, 4 and 7A.

When the brakes are applied heat is generated at the cylindrical portion of the brake drums proportionate to the degree of deceleration and they expand and distort if this heat is not quickly dissipated. The cylindrical portion of the plain type of drum illustrated in Figs. 3, 4 and 7A will distort when heated as shown in dotted lines in Fig. 7A so that the outer portion thereof will move out of contact with the internal or expanding type of brake shoe or will force a portion of the external or contracting brake band out of contact and thus decrease the area of contact between the brake shoes and drum and decrease the total braking area and the braking effect on that rotating wheel.

That type of drum illustrated in Fig. 7C will distort by bulging out in the middle of the transverse cylindrical portion as shown by the dotted lines. This results because the flat disc like portion of the drum tends to hold one edge of the transverse cylindrical portion in shape while the reinforcing lip tends to hold the other edge in shape both of these disc portions serving also to radiate heat from the adjoining cylindrical portion. Because of this bulge the brake shoe and brake drum will contact only near the edge portions of the drum after the distortion thereof by heat and thus the total braking effort is decreased on the wheel equipped with this type of drum.

The equalizing means permits a relative movement of all brake applying parts. The co-efficient of friction between the brake shoe lining and the rotating drum is decreased by the increase of heat and this, plus the reduction of the effective area tends to decrease the braking effect of a brake which is allowed to heat up and offset increased pressures on the reduced braking areas.

In an internal expanding type of brake the outwardly directed pressure of the brake shoes amounting to as high as 100 to 120 pounds per square inch tends to further distort the drum in the same direction as the heat tends to distort it so that this mechanical force acts as an aid or auxiliary to the forces due to heat expansion.

On the other hand if the brake drum is equipped with radiating and reinforcing ribs, 26, as illustrated in Figs. 5, 6 and 7B, the heat generated by the complemental friction elements of the brake when in contact is dissipated rapidly enough by the radiating ribs or fins so that the temperature of the drum does not increase to a degree where it causes a material distortion. The ribs also serve to mechanically hold the drum in its true shape against the action of the brake shoes which are pressing outwardly.

If such a drum is heated in a furnace for instance it will distort by bulging between the ribs as shown in the dotted lines of Fig. 7B which are exaggerated for purposes of illustration but even this result will allow a greater area of contact between the shoe and drum than is present with drums of the kind shown in Figs. 7A or 7C. In practice the drum equipped with radiating ribs will not heat up sufficiently to cause material distortion due to the fact that the ribs tend to dissipate the heat and also to mechanically strengthen the drum against any force which tends to distort it.

In a pleasure car equipped with rib front wheel brake drums and plain rear wheel brake drums severe braking such as that which occurs when rapid deceleration is attempted while travelling at a high speed will cause the rear drums to heat up and distort and thus decrease their effectiveness while the front drums will radiate the heat and maintain their shape and efficiency so that relatively speaking as between the front and rear brakes the rear brakes will decrease their effectiveness during application of the brakes in proportion to the severity of the braking action, while the front brakes maintain their efficiency and reply to braking demands. This tends to compensate for the transfer of weight explained heretofore and thus allow for the utilization of substantially all the friction available between the roadway and tires.

In a commercial vehicle or motor truck brake areas are preferably chosen so as to give satisfactory braking effects when the truck is fully loaded. The result is that these brakes are so large that they will decelerate an empty truck without heating sufficiently to cause material distortion or change in the co-efficient of friction between the brake lining and brake drum. The presence of ribs on one set of brake drums will not materially affect the normal or pre-determined efficiency of the various brake mechanisms of an empty truck. Such a truck carries at least one-half of its load on the front wheels (and may carry more) and one-half on the rear wheels so that equally effective brake mechanism on both front and rear axles are desirable when the vehicle is lightly loaded.

When this truck is loaded up to capacity the load often equals the weight of the vehicle and if so is positioned so that most of it falls on the rear wheels only (see Fig. 9). Under these conditions it is obvious that it is desirable to increase the efficiency of the rear wheel brakes relative to the front wheel brakes in order to utilize the increase of available friction existing between the rear wheels and the roadway. We accomplish this by equipping the rear wheel brakes only with radiating and reinforcing ribs which tend to increase the efficiency of these brakes by maintaining a comparatively low temperature for the brake lining and drum so as to maintain a high co-efficient of friction between the lining and drum and prevent distortion of the drum due to heat expansion. The temperature of the brakes will be higher on a loaded than on an empty truck for the heat to be absorbed by the brakes is proportional to the weight of the truck and load and therefore the uncooled drums on the front wheels heat up and distort under severe braking efforts while the rear drums will maintain their efficiency and thus the rear will be made relatively more effective when the truck is loaded.

In an external contracting brake as shown in Figs. 10, 11, 12 and 13 the radiating ribs serve the same purpose as the ribs placed on the drum of an internal expanding brake. They keep the brake lining and the drum cool with the same desirable results as were enumerated and explained above in regard to the internal expanding brake.

We have seen fit to illustrate and describe our invention as embodied in four wheel vehicles but we contemplate its use in any automotive vehicle which is supported at or near the front thereof and at or near the rear thereof by wheels regardless of the number of wheels with which the vehicle is equipped.

We claim:

1. In an automotive vehicle, front wheel brakes and rear wheel brakes, contracting frictional elements for front and rear wheel brakes and radiating ribs associated with said contracting elements of one set of brakes only.

2. In an automotive vehicle, brake mechanism for the wheels at one end thereof, brake mechanism for the wheels at the other end thereof, said brake mechanisms adapted to be operated by a common means providing pre-determined distribution of brake operating forces to each brake mechanism, and heat radiating means associated with one only of said brake mechanisms for causing relatively different temperatures to be created at the friction elements of said mechanisms during simultaneous operation thereof.

3. In an automotive vehicle, brake mechanism for the wheels at one end thereof, brake mechanism for the wheels at the other end thereof, said brake mechanisms adapted to be operated by a common means providing pre-determined distribution of brake operating forces to each brake mechanism, and heat radiating means comprising heat radiating ribs associated with one only of said mechanisms for maintaining maximum frictional efficiency between the complemental friction elements thereof.

4. In an automotive vehicle, brake mechanism for the wheels at one end thereof, brake mechanism for the wheels at the other end thereof, said brake mechanisms adapted to be operated by a common means providing pre-determined distribution of brake operating forces to each brake mechanism, brake lining for said brake mechanisms characterized by the fact that its co-efficient of friction relative to the complemental friction elements varies inversely as its temperature, and heat radiating means associated with said mechanisms, at the forward end of the vehicle only, for maintaining maximum frictional efficiency between the complemental friction elements thereof.

CALEB S. BRAGG.
VICTOR W. KLIESRATH.